N. K. KEELEY.
DEPRESSER FOR FRUIT JARS.
APPLICATION FILED JAN. 17, 1908.
900,740.
Patented Oct. 13, 1908.
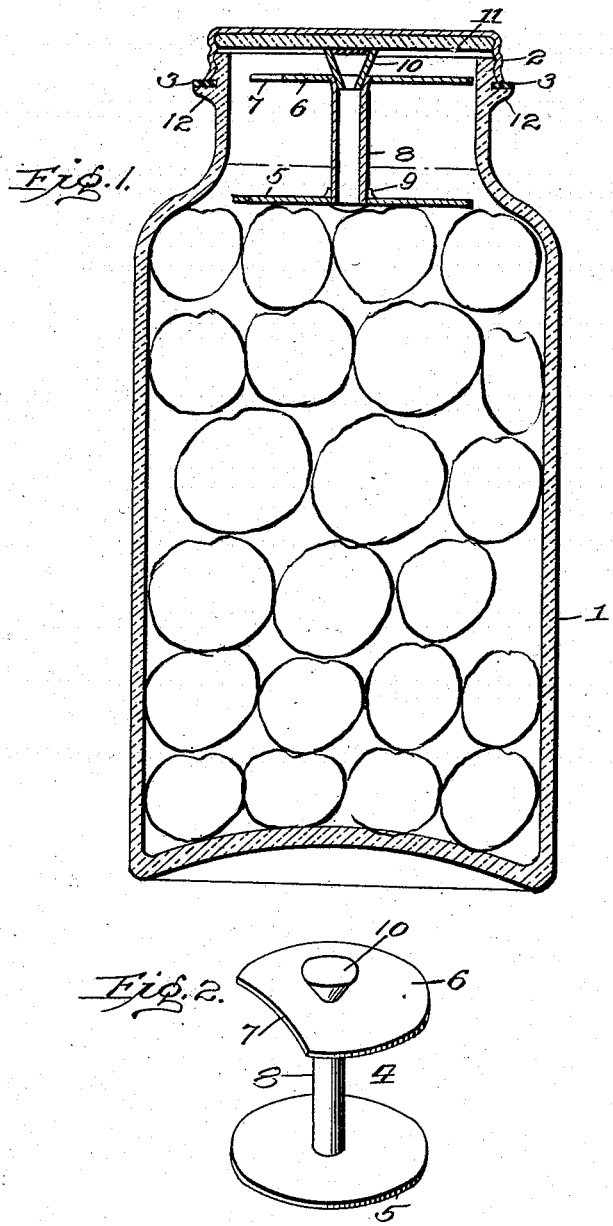
Witnesses
J. M. Fowler Jr.
A. S. Kitchin.
Inventor
Nora K. Keeley
By Mason Fenwick & Lawrence
his Attorneys

UNITED STATES PATENT OFFICE.

NORA K. KEELEY, OF OWENSBORO, KENTUCKY, ASSIGNOR TO JESSE E. RICE, OF OWENSBORO, KENTUCKY.

DEPRESSER FOR FRUIT-JARS.

No. 900,740.  Specification of Letters Patent.  Patented Oct. 13, 1908.

Application filed January 17, 1908. Serial No. 411,317.

*To all whom it may concern:*

Be it known that I, NORA K. KEELEY, a citizen of the United States, residing at Owensboro, in the county of Daviess and State of Kentucky, have invented certain new and useful Improvements in Depressers for Fruit-Jars; and I do hereby declare the following to be a full, clear, and exact description of the invention, such as will enable others skilled in the art to which it appertains to make and use the same.

This invention relates to improvements in depressers for fruit jars, and has for an object the provision of a depresser arranged to be placed in the top or neck of a bottle for holding the fruit or other comparatively solid material therein in a compact condition in the main body portion of the bottle, and prevents any upward movement of the same.

Another object in view is the provision of a depresser arranged to hold the fruit in a bottle or can in the main body portion thereof and to provide a space for liquid to be placed for covering the matter contained in the body portion of the bottle or can, so as to effectually prevent any of the matter contained therein coming in contact with air or being removed or partially removed from the liquid surrounding it.

With these and other objects in view the invention comprises certain novel constructions, combinations, and arrangement of parts as will be hereinafter more fully described and claimed.

In the accompanying drawings: Figure 1 is a vertical section through a bottle and depresser formed according to the present invention. Fig. 2 is a perspective view of the depresser.

In the canning or preserving of fruits of various kinds and also vegetables it has been found that if the fruit or vegetable is kept submerged in the liquid in which it is packed it will keep or be preserved in the proper condition as intended.

It is among the objects of the present invention to provide a structure for maintaining fruit, vegetables, and the like submerged in the liquid in which it is made and packed until it is time for opening the receptacle holding the same.

Referring to the drawing, 1 indicates a bottle or jar of any desired type having a cover 2 and a gasket 3 for properly securing the bottle against the entrance of air. In use the bottle 1 may be used, or any other receptacle that may be desired, the only requisite being that the receptacle must be capable of being sealed air-tight as is usual in the preserving and canning of various fruits. Positioned in the neck of the bottle is a depresser 4 designed to hold down in a compact state all the solid or comparatively solid material, as fruit, that is designed to be preserved. The depresser 4 is arranged with a disk shaped member 5 which comes in contact with the fruit, and a disk shaped member 6 at the opposite end formed with a cut-away portion 7 through which the liquid in which the fruit is preserved is designed to be passed. Connecting disk or member 5 and disk or member 6 is a tube 8 that preferably passes through both disks and is soldered in place. The disk 5 is flared at 9 for assisting the solder in holding the same in place upon member 8. Secured to the tube 8 and also to disk 6 is a top piece or lug 10 that is preferably passed through disk 6 and extends into tube 8, as seen in Fig. 1. After it has been placed in position it is soldered in place so as to prevent any accidental removal.

In constructing the depresser 4 the same is made of a sufficient length to just come level with the bottom of the neck of the bottle or receptacle to which the same is secured, if desired the same may extend further down into the receptacle, or fall short of the bottom of the neck of the receptacle. A head or lug 10 is designed to rest against the cap 2 and the disk 6 assisted somewhat by disk 5 will prevent the depresser from becoming displaced or moved to an undesirable position in the receptacle. The depresser or rest 4 may be made of sheet metal as shown and described or may be made out of glass similar to the glass lining 11 of the cap 2 but ordinarily the rest is made from glass so as to provide a more sanitary rest, and one that will be unobjectionable. The rest may be used in any constructed bottle or receptacle but preferably is used in a bottle as shown in which the depresser is of substantially the same length as the neck, the bottle being provided with a cap as 2, a gasket as 3 and a rest 12 for receiving the gasket.

In use the fruit or other matter being canned or preserved is taken from the liquid in which the same is cooked and placed in the jar until the jar is filled and then the rest or depresser is placed in the neck of the jar and forced downward until the same reaches the position substantially that shown in Fig. 1. If there is too large an amount of fruit in the jar, some of the same must be removed to permit the rest to take a position substantially as shown in Fig. 1. After the rest has been placed in this position the liquid in which the fruit has been cooked is again poured in through the aperture caused by cut-away portion 7 until the interstices have been filled with liquid and also the neck of the bottle filled. The cap 2 is then screwed down into place and the jar or receptacle is set away. Usually it is best to set the jar aside until cool and to again tighten the cap 2 so as to be positive the sealing is secure. In the course of time the fruit or other matter contained in the receptacle would shrink somewhat and rise to the top if some means were not provided for holding the same down. The rest forming the present invention is designed to accomplish this object and by this means always preserve a quantity of liquid above the fruit or other matter in the jar. This will prevent any of the fruit coming to the top and becoming uncovered or partially removed from the liquid thus causing it to decay or spoil.

What I claim is:

1. In combination a receptacle, a cap therefor, and a depresser, said depresser being provided with a plurality of disks, one of which having a cut-away portion for permitting the passage of liquid into said receptacle, a connecting tube, and a lug for spacing said cut-away disk from said cap and for holding the other of said disks in contact with the matter contained in said receptacle.

2. In combination a receptacle, a cap therefor, and a depresser positioned in said receptacle comprising a disk for engaging the matter in said receptacle, a second disk for preventing the dislocation of said first mentioned disk, a tube connecting said disks, and means for holding said second mentioned disk out of contact with said cap, said second mentioned disk being provided with a cut-away portion for permitting liquid to be passed into said receptacle on top of the matter contained therein.

In testimony whereof I affix my signature in presence of two witnesses.

NORA K. KEELEY.

Witnesses:
V. J. GREENWELL,
J. S. STINNAN.